US011148556B2

(12) United States Patent
Smith et al.

(10) Patent No.: US 11,148,556 B2
(45) Date of Patent: Oct. 19, 2021

(54) VEHICLE SEAT HINGE ASSEMBLY

(71) Applicant: Mahindra N.A. Tech Center, Auburn Hills, MI (US)

(72) Inventors: Owen T. Smith, Flint, MI (US); John P. Pacella, Rochester Hills, MI (US); Robert B. Mooney, Clarkston, MI (US); Michael Berta, Rochester Hills, MI (US)

(73) Assignee: Mahindra N.A. Tech Center, Auburn Hills, MI (US)

( * ) Notice: Subject to any disclaimer, the term of this patent is extended or adjusted under 35 U.S.C. 154(b) by 116 days.

(21) Appl. No.: 16/536,837

(22) Filed: Aug. 9, 2019

(65) Prior Publication Data

US 2021/0039524 A1    Feb. 11, 2021

(51) Int. Cl.
*B60N 2/10*    (2006.01)
*B60N 2/90*    (2018.01)

(52) U.S. Cl.
CPC .............. *B60N 2/10* (2013.01); *B60N 2/933* (2018.02); *B60N 2002/971* (2018.02)

(58) Field of Classification Search
None
See application file for complete search history.

(56) References Cited

U.S. PATENT DOCUMENTS

| | | | | |
|---|---|---|---|---|
| 735,070 A | * | 8/1903 | Davidson | B60N 2/3086 297/236 |
| 1,578,676 A | * | 3/1926 | Morgan | B60N 2/309 248/398 |
| 2,116,366 A | * | 5/1938 | Scott | B60N 2/3011 297/43 |
| 4,168,819 A | * | 9/1979 | Ducrocq | B60N 2/502 248/573 |
| 4,372,607 A | * | 2/1983 | Mizushima | B60N 2/10 296/65.05 |
| 6,012,776 A | * | 1/2000 | Schneider | B60N 2/366 296/65.17 |

(Continued)

FOREIGN PATENT DOCUMENTS

| | | |
|---|---|---|
| JP | 05-000532 U | 1/1993 |
| JP | 2005-289246 A | 10/2005 |

(Continued)

OTHER PUBLICATIONS

International Search Report for corresponding case PCT/US2020/044935, dated Nov. 11, 2020.

(Continued)

*Primary Examiner* — David E Allred
(74) *Attorney, Agent, or Firm* — Harness, Dickey & Pierce, P.L.C.

(57) ABSTRACT

A vehicle seat hinge assembly including a base plate, a seat support assembly, and an off-center hinge. The base plate is configured to mount to a vehicle and the seat support assembly is configured to mount to the seat. The off-center hinge of the vehicle seat hinge assembly is positioned at one corner of the base plate and pivotally couples at least part of the seat support assembly to the base plate. The base plate has a base plate centerline and the off-center hinge has a hinge axis that is arranged at an oblique angle relative to the base plate centerline.

17 Claims, 5 Drawing Sheets

(56) References Cited

U.S. PATENT DOCUMENTS

| | | | | |
|---|---|---|---|---|
| 6,811,200 B2* | 11/2004 | Shibata | ................... | B60N 2/01 296/64 |
| 6,843,526 B2* | 1/2005 | Honda | ................. | B60N 2/3011 296/65.03 |
| 7,014,241 B2* | 3/2006 | Toyota | ................. | B60N 2/3018 296/37.15 |
| 7,077,474 B2* | 7/2006 | Satani | ................. | B60N 2/3034 297/112 |
| 7,490,896 B2* | 2/2009 | Smith | ................. | B60N 2/3011 297/188.04 |
| 7,597,389 B2* | 10/2009 | Kojima | ................ | B60N 2/3011 188/290 |
| 7,954,873 B2* | 6/2011 | Abe | ....................... | B60N 2/366 296/65.05 |
| 8,033,604 B2* | 10/2011 | Behrens | ............... | B60N 2/3011 297/236 |
| 8,152,215 B1* | 4/2012 | Tsumiyama | ............. | B60N 2/68 296/63 |
| 8,308,238 B2* | 11/2012 | Imaoka | ................... | B60R 22/26 297/236 |
| 8,562,060 B2* | 10/2013 | Kato | .................... | B60N 2/3043 296/65.12 |
| 9,033,422 B2* | 5/2015 | Miyazawa | ........... | B60N 2/3043 297/472 |
| 10,131,263 B2* | 11/2018 | Huebner | ................ | B60N 3/102 |
| 10,457,171 B2* | 10/2019 | Line | ......................... | B60N 2/32 |
| 10,632,933 B2* | 4/2020 | Line | ........................ | B60N 3/002 |
| 2003/0127891 A1 | 7/2003 | Wiedeman et al. | | |
| 2007/0052255 A1* | 3/2007 | O'Connor | .......... | B60N 2/01583 296/65.03 |
| 2010/0117275 A1* | 5/2010 | Nakamura | .............. | E02F 9/166 267/133 |
| 2010/0207418 A1* | 8/2010 | Sayama | ................. | B60N 2/305 296/65.09 |
| 2011/0115274 A1* | 5/2011 | Hazlewood | .............. | B60N 2/12 297/378.12 |
| 2011/0227385 A1 | 9/2011 | Holder | | |
| 2016/0355108 A1* | 12/2016 | Kimata | ..................... | B60N 2/12 |
| 2019/0106016 A1* | 4/2019 | Korte | ....................... | B60N 2/64 |
| 2019/0168637 A1* | 6/2019 | Abe | ...................... | B60N 2/3011 |
| 2020/0262318 A1* | 8/2020 | Maeda | ..................... | B60N 2/38 |

FOREIGN PATENT DOCUMENTS

| | | | | |
|---|---|---|---|---|
| KR | 20-1999-0010127 U | | 3/1999 | |
| KR | 20040040366 A | * | 5/2004 | ............. B60R 7/043 |

OTHER PUBLICATIONS

Written Opinion for corresponding case PCT/US2020/044935, dated Nov. 11, 2020.

* cited by examiner

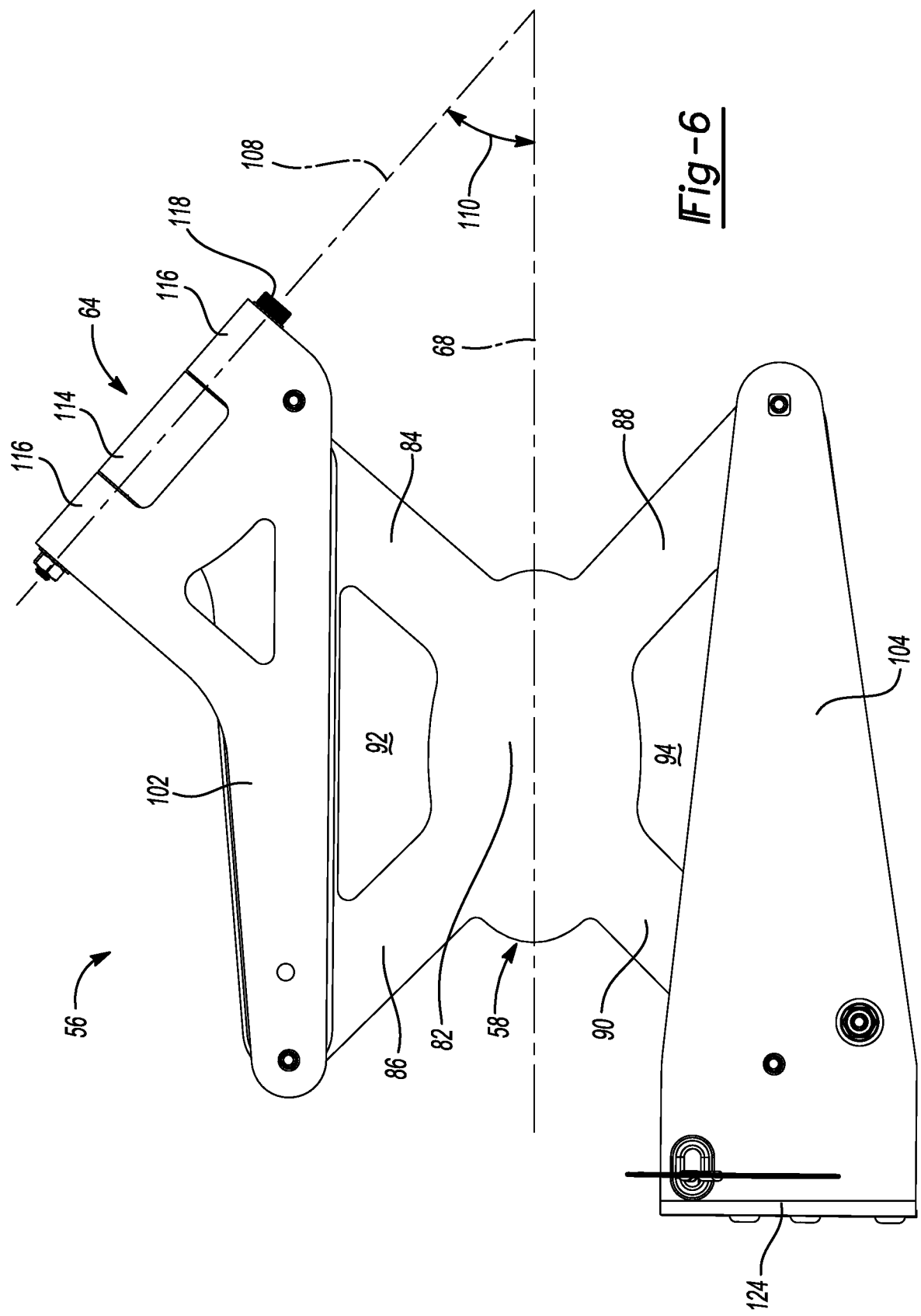

VEHICLE SEAT HINGE ASSEMBLY

FIELD

The present disclosure relates generally to seat assemblies for a vehicle and more particularly to vehicle seat hinge assemblies for pivotally mounting a seat to a vehicle.

BACKGROUND

The statements in this section merely provide background information related to the present disclosure and may not constitute prior art.

The market for off-road utility vehicles, which are sometimes referred to as "UTVs" or "ORVs", has grown in recent years. The design of such vehicles has also evolved, with designs featuring second row seating and/or a storage area behind the first row of seats. In vehicles with second row seating, doors or door openings are sometimes provided to facilitate ingress and egress to the second row seating. Designs that have second row doors (i.e., four-door variants) are more complicated and costly to manufacture and have increased weight. Designs that have second row door openings can have less body rigidity due to the extra door openings. As a result, these solutions are less than ideal for off-road utility vehicles, where cost, weight, and rigidity are important design considerations.

Two door automobiles have long included seat mechanisms that allow front row seats to tilt and slide forward to provide better ingress and egress to second row seats. In these designs, the seat back pivots about an axis that is perpendicular to the vehicle centerline and the entire seat then slides forward. This solution is not well suited for off-road utility vehicles because the combined tilt and slide mechanisms are too complex and costly. In addition, many off-road utility vehicles provide less space between the seat and the front dashboard, so there is less room for the seat to tilt forward and slide. A better solution is therefore needed, particularly in the off-road utility vehicle market segment.

SUMMARY

This section provides a general summary of the disclosure, and is not a comprehensive disclosure of its full scope or all of its features.

In accordance with one aspect of the present disclosure, a vehicle seat hinge assembly is provided that includes a base plate, a seat support assembly, and an off-center hinge. The base plate is configured to mount to a vehicle and the seat support assembly is configured to mount to the seat. The off-center hinge of the vehicle seat hinge assembly is positioned at one corner of the base plate and pivotally couples at least part of the seat support assembly to the base plate. The base plate has a base plate centerline and the off-center hinge has a hinge axis that is arranged at an oblique angle relative to the base plate centerline.

In accordance with another aspect of the present disclosure, a seat assembly for a vehicle is provided. The seat assembly includes a seat and the vehicle seat hinge assembly described above, which is configured to secure the seat to the vehicle at an orientation where the base plate centerline is spaced from and runs parallel to a centerline of the vehicle (i.e., vehicle centerline). The seat support assembly includes a first hinge plate mounted to the base plate, a second hinge plate mounted to the seat base, and a latch plate that is laterally spaced from the second hinge plate and that is mounted to the seat. The off-center hinge pivotally couples the first and second hinge plates. The off-center hinge allows the second hinge plate and the latch plate, and therefore the seat, to rotate between a rest position and a tilted position about the hinge axis, which is arranged at an oblique angle relative to the base plate centerline. The vehicle seat hinge assembly may additionally include a latch assembly, mounted to the latch plate, that releasably couples at least part of the seat support assembly to the base plate.

The vehicle seat hinge assembly described herein allows the seat to pivot/swing up and forward at an angle relative to the vehicle centerline, where the seat moves closer to the vehicle centerline and closer to a front end of the vehicle to provide easier ingress and egress into and out of the vehicle. This improves access to second row seats and/or the area behind first row seats (e.g., a cargo area) without requiring additional second row doors or door openings. At the same time, the vehicle seat hinge assembly described herein is simpler, less costly, and more robust than the combined tilt and slide mechanisms used in automobiles and requires less space between the seat and the front dashboard of the vehicle.

BRIEF DESCRIPTION OF THE DRAWINGS

Other advantages of the present disclosure will be readily appreciated, as the same becomes better understood by reference to the following detailed description when considered in connection with the accompanying drawings wherein:

FIG. 6 is a top plan view of the vehicle seat hinge assembly illustrated in FIG. 3.

DETAILED DESCRIPTION

Figure 1:
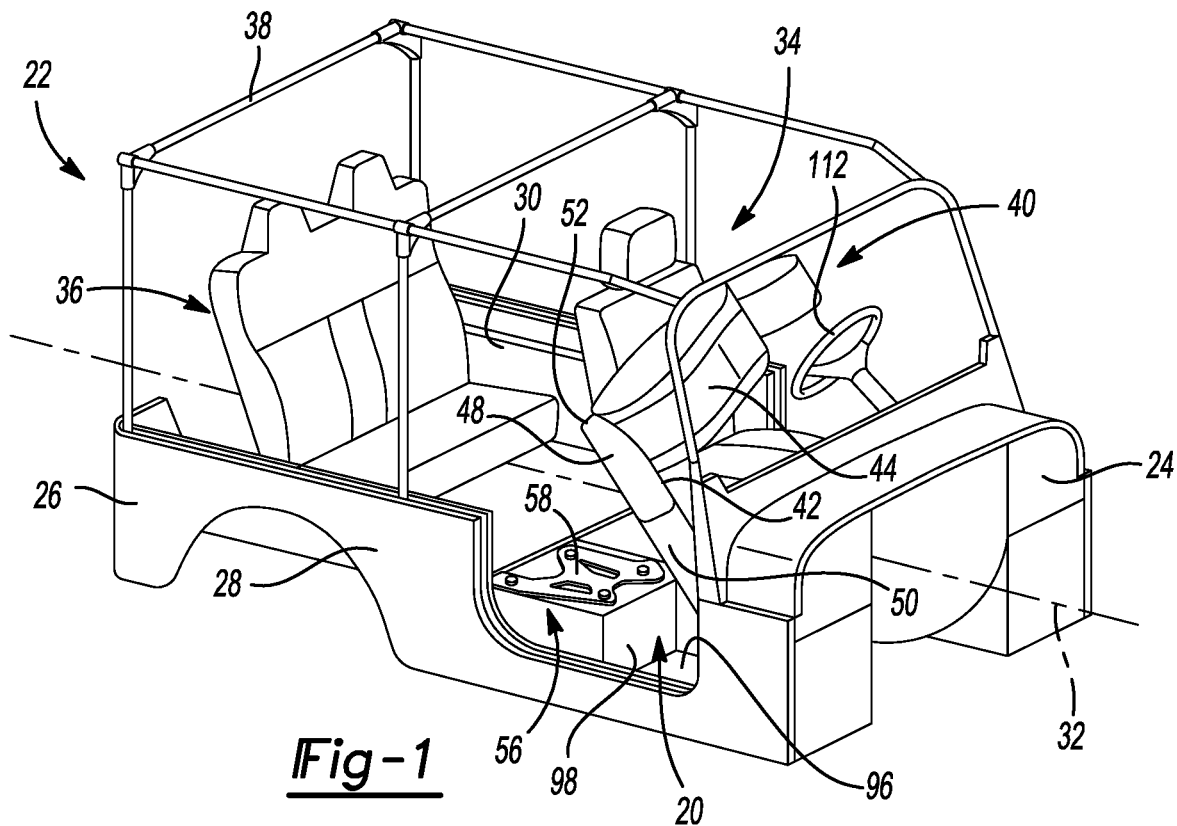
FIG. 1 is a front perspective view of an exemplary seat assembly of the present disclosure, shown installed in a vehicle and rotated to a tilted position.

Referring to the Figures, wherein like numerals indicate corresponding parts throughout the several views, a seat assembly 20 for a vehicle 22 is shown.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
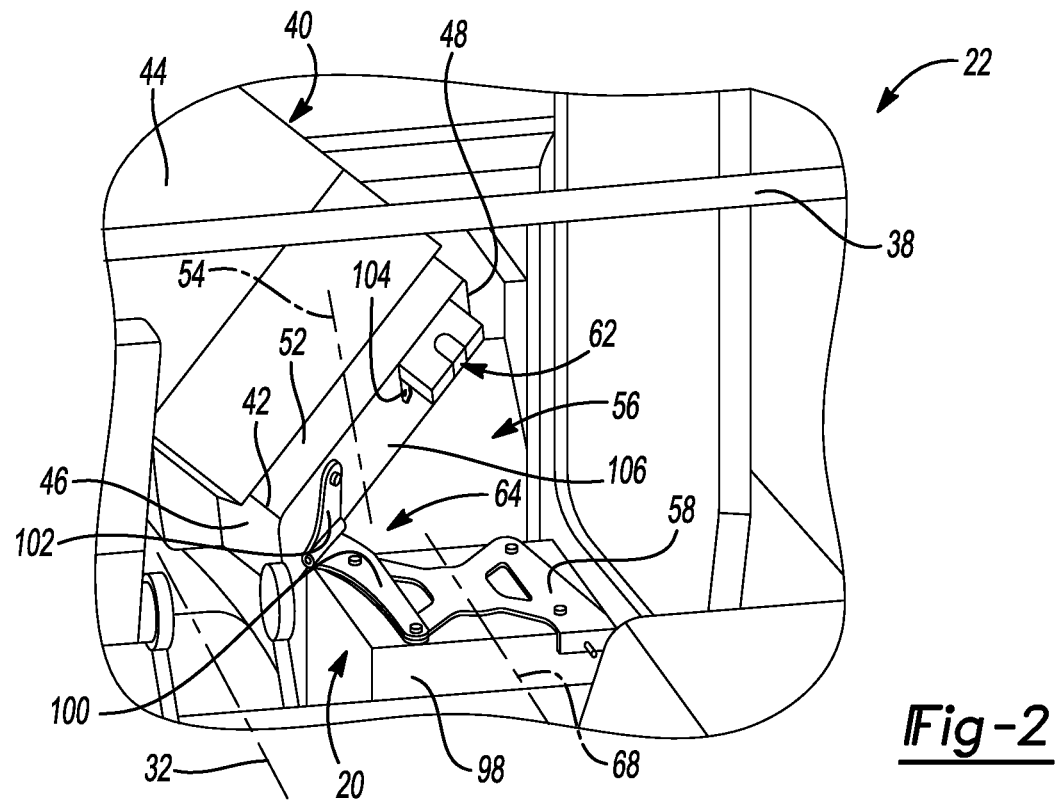
FIG. 2 is a rear perspective view of the exemplary seat assembly illustrated in FIG. 1.

With reference to FIGS. 1 and 2, the seat assembly 20 is shown installed in a vehicle 22. The vehicle 22 generally includes a front end 24, and rear end 26, a passenger side 28, and a driver's side 30. The vehicle 22 also includes a vehicle centerline 32 that runs longitudinally down the center of the vehicle 22 from the front end 24 to the rear end 26. In the illustrated example, the vehicle 22 is an off-road utility vehicle (sometimes referred to as a "UTV" or "ORV") that has a first row of seats 34, a second row of seats 36, and a roll cage 38. However, it should be appreciated that the subject disclosure applies equally to other types of vehicles, including trucks and automobiles.

Each seat 40 includes a seat base 42 and a seat back 44. The seat base 42 has an inboard edge 46, an outboard edge 48, a front edge 50, and a rear edge 52. The seat base 42 also has a seat base centerline 54 that is positioned between the inboard and outboard edges 46, 48 of the seat base 42. The seat base centerline 54 runs in a longitudinal direction from the front edge 50 to the rear edge 52 of the seat base 42. As a result, the seat base centerline 54 is spaced from and runs parallel to the vehicle centerline 32 when the seat 40 is in a rest position.

The seat assembly 20 also includes a vehicle seat hinge assembly 56. In the illustrated example, the vehicle seat hinge assembly 56 is attached to a front passenger seat 40 of the vehicle 22; however, the vehicle seat hinge assembly 56 disclosed herein could be installed in a number of different seat locations. The vehicle seat hinge assembly 56 is configured to secure the seat 40 to the vehicle 22 in an orientation where the seat base centerline 54 is spaced from and parallel to the vehicle centerline 32 when the seat 40 is in the rest position such that the inboard edge 46 of the seat base 42 is positioned closer to the vehicle centerline 32 than the outboard edge 48 of the seat base 42. As a result, the outboard edge 48 of the seat base 42 is positioned near the passenger side 28 of the vehicle 22 in the illustrated example. As shown in FIGS. 1 and 2, the vehicle seat hinge assembly 56 allows the seat 40 to pivot/swing up and forward at an angle relative to the vehicle centerline 32 from the rest position to a tilted position, where the seat 40 moves closer to the vehicle centerline 32 and closer to the front end 24 of the vehicle 22 to provide easier ingress and egress into and out of the vehicle 22. This makes the second row of seats 36 more accessible and/or the area behind the first row of seats 34 more accessible (e.g., cargo area).

With additional reference to FIGS. 3-6, the vehicle seat hinge assembly 56 includes a base plate 58, a seat support assembly 60, a latch assembly 62, and an off-center hinge 64. The base plate 58 is configured to mount to the vehicle 22 with fasteners 66. The seat support assembly 60 is configured to mount to the seat base 42 with fasteners 66. The latch assembly 62 releasably couples at least part of the seat support assembly 60 to the base plate 58 and the off-center hinge 64 pivotally couples at least part of the seat support assembly 60 to the base plate 58. In the tilted position, the seat base centerline 54 is arranged at a non-parallel angle with the vehicle centerline 32 due to the design of the off-center hinge 64.

The base plate 58 has a base plate centerline 68 that is aligned with or extends parallel to the seat base centerline 54. As a result, the base plate centerline 68 is also spaced from and runs parallel to the vehicle centerline 32. The base plate 58 includes a front inboard corner 70 and a rear inboard corner 72 that are aligned with the inboard edge 46 of the seat base 42. The base plate 58 also includes a front outboard corner 74 and a rear outboard corner 76 that are aligned with the outboard edge 48 of the seat base 42. The front and rear inboard corners 70, 72 are positioned closer to the vehicle centerline 32 than the front and rear outboard corners 74, 76 when the seat 40 is installed in the vehicle 22. It follows that the front inboard and outboard corners 70, 74 of the base plate 58 are closer to the front end 24 of the vehicle 22 than the rear inboard and outboard corners 72, 76.

Figure 5:
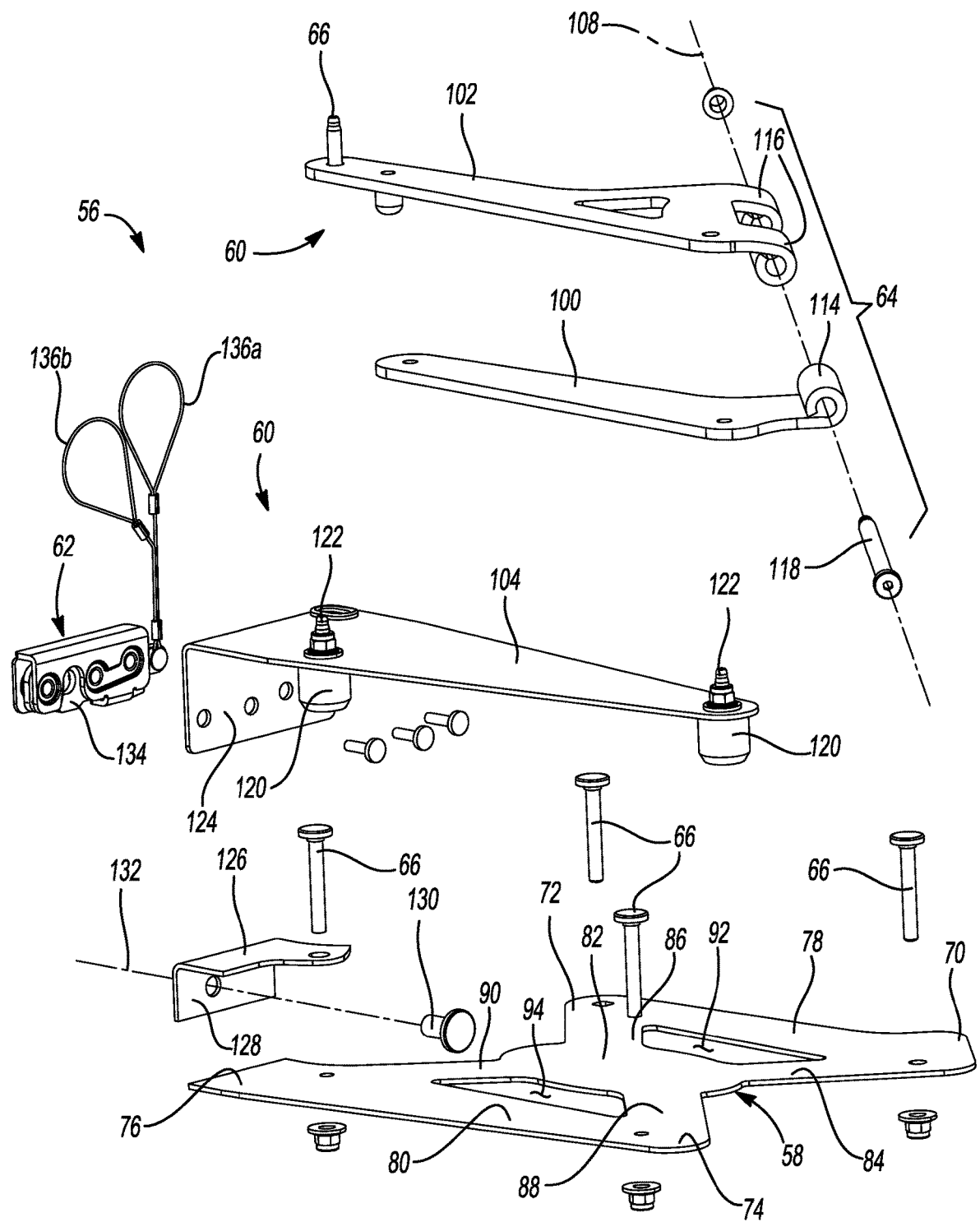
FIG. 5 is an exploded perspective view of the vehicle seat hinge assembly illustrated in FIG. 3.

Although other configurations are possible, the base plate 58 in the illustrated example is formed as flat plate. As shown in FIG. 5, the base plate includes an inboard segment 78, an outboard segment 80, and a center portion 82. The inboard segment 78 of the base plate 58 extends longitudinally between the front and rear inboard corners 70, 72 of the base plate 58. The outboard segment 80 of the base plate 58 extends longitudinally between the front and rear outboard corners 74, 76 of the base plate 58. A first diagonal segment 84 extends between the center portion 82 and the front inboard corner 70 of the base plate 58. A second diagonal segment 86 extends between the center portion 82 and the rear inboard corner 72 of the base plate 58. A third diagonal segment 88 extends between the center portion 82 and the front outboard corner 74 of the base plate 58. A fourth diagonal segment 90 extends between the center portion 82 and the rear outboard corner 76 of the base plate 58. As a result, the inboard segment 78, the center portion 82, and the first and second diagonal segments 84, 86 cooperate to frame an inboard opening 92 in the base plate 58 and the outboard segment 80, the center portion 82, and the third and fourth diagonal segments 88, 90 cooperate to frame an outboard opening 94 in the base plate 58. Although alternative base plate designs are possible, the subject design helps to reinforce the structure of the vehicle 22 (e.g., floor 96 or seat pedestal 98) to which the base plate 58 is mounted and allows the base plate 58 to act as a reinforced step to aid in passenger ingress and egress into and out of the vehicle 22. It should be appreciated that in alternative configurations, the base plate 58 may be made of several separately formed components or may be integrated into the structure of the vehicle 22 (e.g., into the floor 96 or seat pedestal 98).

The seat support assembly 60 includes a first hinge plate 100, a second hinge plate 102, and a latch plate 104. The first hinge plate 100 is mounted to the base plate 58 with fasteners 66 and extends from the front inboard corner 70 of the base plate 58 to the rear inboard corner 72 of the base plate 58. The second hinge plate 102 is mounted to an underside 106 of the seat base 42 at a location adjacent to the inboard edge 46 of the seat base 42 with fasteners 66. The latch plate 104 is laterally spaced from the second hinge plate 102 and is mounted to the underside 106 of the seat base 42 at a location adjacent to the outboard edge 48 of the seat base 42 with fasteners 66. It should be appreciated that in alternative configurations, the first hinge plate 100 and the latch plate 104 may be formed as a single piece or combined into a single plate. Alternatively, the first hinge plate 100 and/or the latch plate 104 may be integrated into the seat base 42.

The off-center hinge 64 pivotally couples the first and second hinge plates 100, 102, which allows the vehicle seat hinge assembly 56, and thus the seat 40, to rotate/pivot/tilt between a rest position (FIGS. 3 and 6) and a tilted position (FIGS. 1, 2, and 4) about a hinge axis 108 that is arranged at an oblique angle 110 relative to the base plate centerline 68. The oblique angle 110 is greater than zero degrees and less than ninety degrees and more specifically, the oblique angle 110 between the hinge axis 108 and the base plate centerline 68 may range from forty to fifty degrees. This orientation angles the seat back 44 in such a way that contact between the seat back 44 and a steering wheel 112 of the vehicle 22 may optionally be used as a stop when the seat 40 is in the tilted position. By way of example, the oblique angle 110 between the hinge axis 108 and the base plate centerline 68 is forty five degrees in the illustrated embodiment. The off-center hinge 64 may alternatively be provided with a stop to limit rotation of the seat 40 beyond a pre-defined maximum tilt angle. Although other hinge configurations are possible, the off-center hinge 64 includes a first hinge plate knuckle 114 that extends from the first hinge plate 100 and second hinge plate knuckles 116 that extend from the second hinge plate 102. The first hinge plate knuckle 114 is received between the second hinge plate knuckles 116 and a hinge pin 118 is received in the first and second hinge plate knuckles 114, 116 to pivotally couple the first and second hinge plates 100, 102. As a result, the hinge pin 118 extends co-axially with the hinge axis 108.

Figure 3:
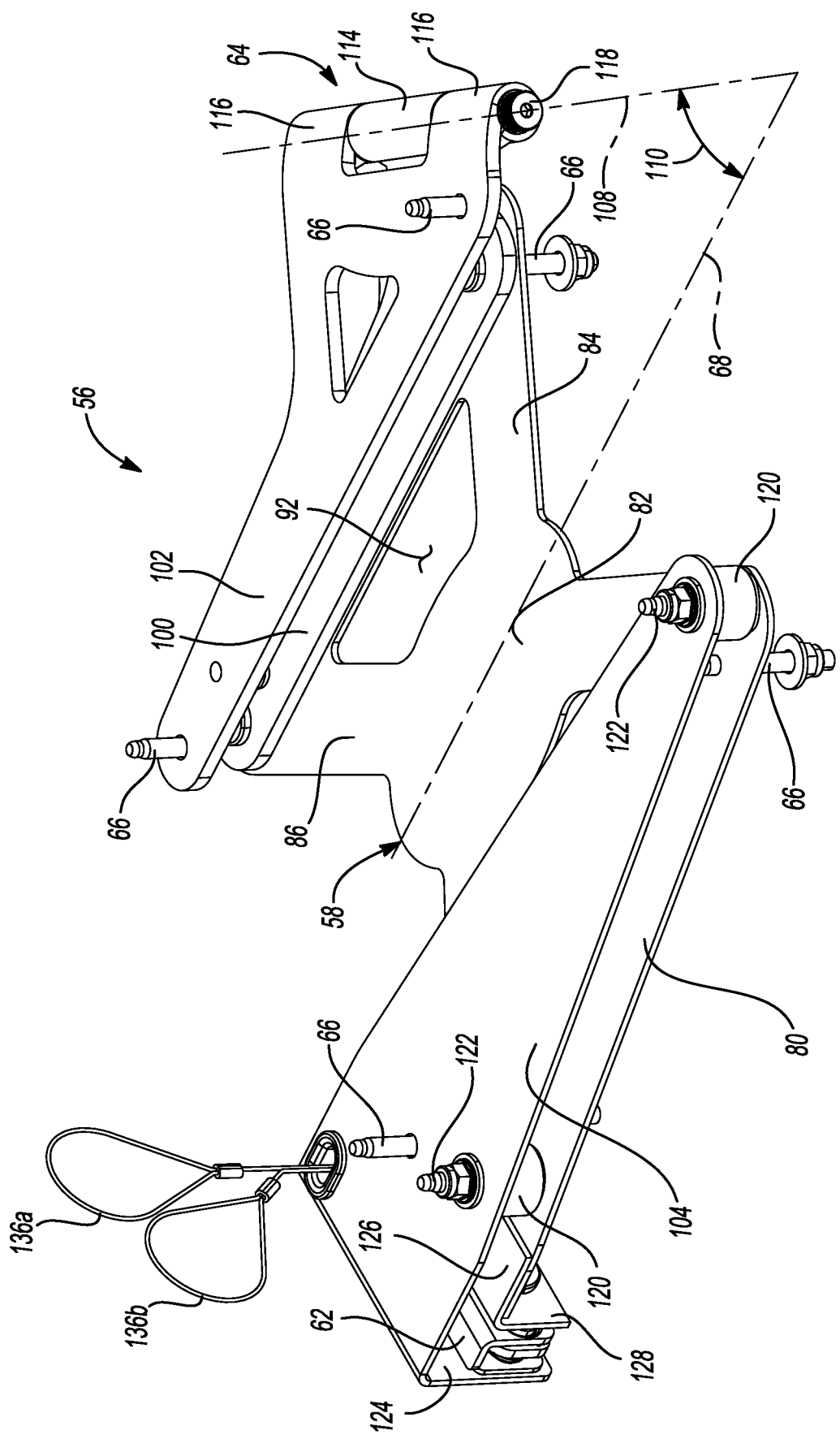
FIG. 3 is a front perspective view of a vehicle seat hinge assembly of the exemplary seat assembly illustrated in FIG. 1, where the vehicle seat hinge assembly is shown in a rest position.
Figure 4:
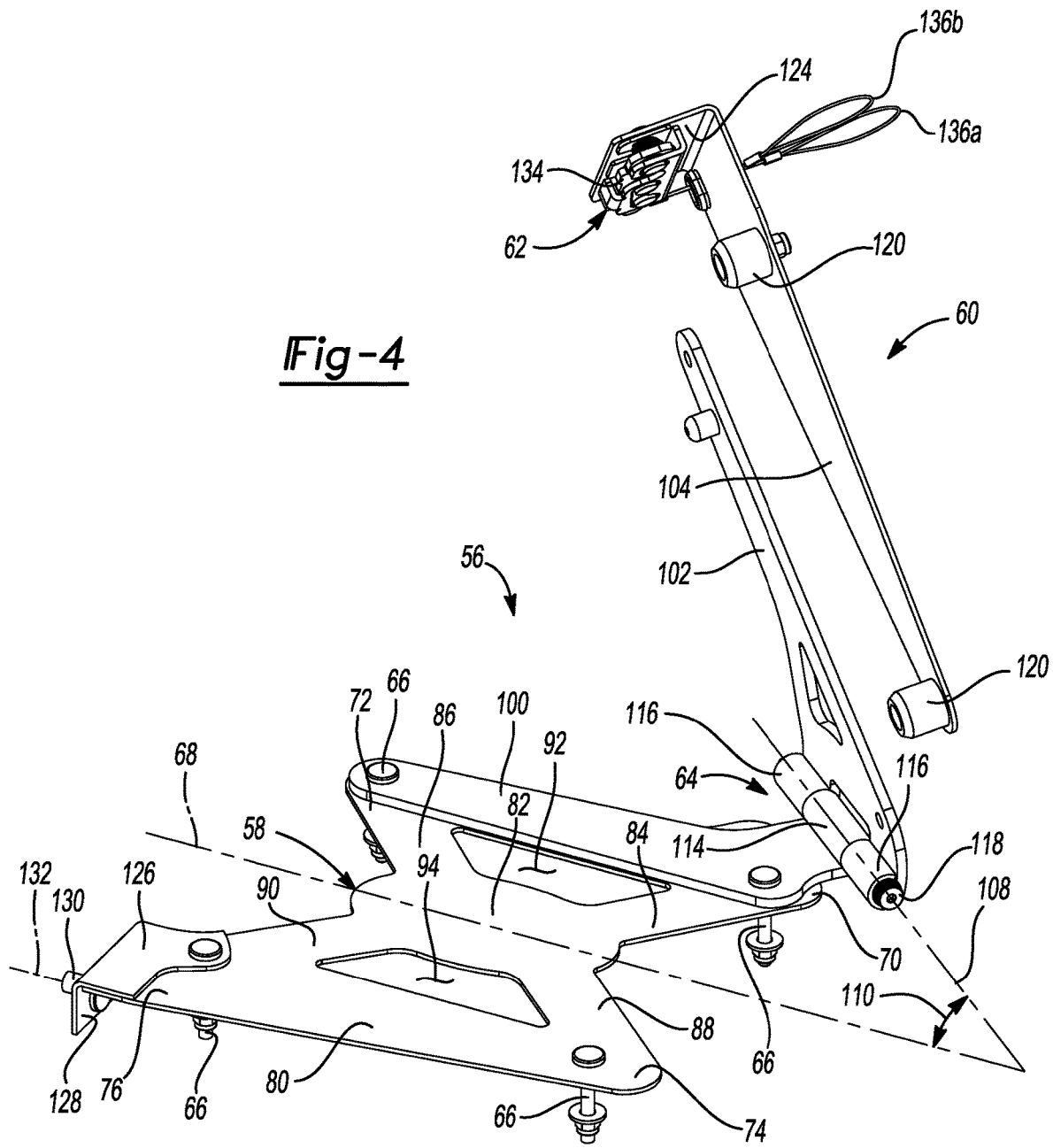
FIG. 4 is another front perspective view of the vehicle seat hinge assembly illustrated in FIG. 3, where the vehicle seat hinge assembly is shown in the tilted position.

Optionally, the vehicle seat hinge assembly 56 may include bumpers 120 that are mounted to studs 122 attached at opposing ends of the latch plate 104. The bumpers 120 may be made of a resilient material and are adapted to contact the front and rear outboard corners 74, 76 of the base plate 58 when the seat 40 is in the rest position (FIG. 3).

Although other configurations are possible, the latch plate 104 includes a latch plate flange 124 that extends downwardly and away from the seat base 42. The latch plate flange 124 is arranged at a perpendicular angle to other portions of the latch plate 104 and the base plate centerline 68. The latch plate flange 124 could be integral with the latch plate 104 or a separate bracket. A latch pin bracket 126 is mounted to the rear outboard corner 76 of the base plate 58. The off-center hinge 64 is located at the front inboard corner 70 of the base plate 58. The latch pin bracket 126 includes a bracket flange 128 that is arranged at a perpendicular angle to the base plate 58 and the base plate centerline 68. The latch pin bracket 126 could alternatively be integrated into the base plate 58 or the structure of the vehicle 22 (such as the floor 96 or seat pedestal 98). A latch pin 130 extends from the bracket flange 128. Although other orientations are possible, in the illustrate example, the latch pin 130 extends co-axially along a latch pin axis 132 that is spaced from and runs parallel to the base plate centerline 68.

The latch assembly 62 is mounted to the latch plate flange 124. As a result, the latch assembly 62 moves with the seat base 42 relative to the base plate 58 and the latch pin 130. The latch assembly 62 including a latching mechanism 134, such as a pair of locking jaws, that receives and engages the latch pin 130 when the seat 40 is in the rest position. The latch assembly 62 may also include release cables 136a, 136b, levers, or similar structures that are configured to release the latching mechanism 134 and permit rotation of the seat 40 about the hinge axis 108 towards the tilted position to facilitate ingress and egress into and out of the vehicle 22. In the illustrated example, the latching mechanism 134 includes a first release cable 136a and a second release cable 136b. The first release cable 136a is configured to extend through a seat bight (i.e., the joint) between the seat base 42 and the seat back 44. As a result, the first release cable 136a is easily accessible to an occupant in the first row of seats 34. The second release cable 136b extends out from under the rear edge 52 of the seat base 42 and therefore is easily accessible to an occupant in the second row of seats 36. Pulling on either one of the first and second release cables 136a, 136b will release the latching mechanism 134.

Many modifications and variations of the present disclosure are possible in light of the above teachings and may be practiced otherwise than as specifically described while within the scope of the appended claims.

What is claimed is:

1. A vehicle seat hinge assembly for pivotally mounting a seat base to a floor or a seat pedestal rigidly mounted in a vehicle, said vehicle seat hinge assembly comprising:
   a base plate configured to mount to the vehicle, said base plate having a base plate centerline extending parallel to a longitudinal centerline of the vehicle, said base plate being substantially planar;
   a seat support assembly configured to mount to the seat base;

a singular off-center hinge that solely pivotally couples said seat support assembly to said base plate; and said off-center hinge having a hinge axis that is arranged at an oblique angle relative to said base plate centerline, said oblique angle being greater than zero degrees and less than ninety degrees, wherein said hinge axis is positioned adjacent to said base plate and adjacent to a lower surface of said seat support assembly, wherein in a position of use, the base plate underlies the support assembly and the support assembly underlies the seat base, wherein said base plate includes a front inboard corner, a rear inboard corner, a front outboard corner, and a rear outboard corner and wherein said base plate is configured to be installed in the vehicle such that said front and rear inboard corners of said base plate are positioned closer to said longitudinal centerline of the vehicle than said front and rear outboard corners, wherein said off-center hinge is positioned at said front inboard corner of said base plate.

2. The vehicle seat hinge assembly as set forth in claim 1, wherein said seat support assembly includes a first hinge plate that is mounted to said base plate and a second hinge plate that is configured to mount to the seat.

3. The vehicle seat hinge assembly as set forth in claim 2, wherein said off-center hinge includes a first hinge plate knuckle extending from said first hinge plate, a second hinge plate knuckle extending from said second hinge plate, and a hinge pin received in said first and second hinge plate knuckles and that extends co-axially with said hinge axis.

4. A vehicle seat hinge assembly for pivotally mounting a seat base to a floor or a seat pedestal rigidly mounted in a vehicle, said vehicle seat hinge assembly comprising:

a flat base plate configured to mount to the vehicle, said base plate defining a plane;

a seat support assembly configured to mount to a lower surface of the seat base such that the lower surface is adjacent and parallel to said plane, wherein in a position of use, the base plate underlies the support assembly and the support assembly underlies the seat base;

a latch assembly releasably coupling at least part of said seat support assembly to said base plate;

an off-center hinge positioned at one corner of said base plate that solely pivotally couples said seat support assembly to said base plate, said latch assembly being positioned at another corner of said base plate, opposite said one corner; and said off-center hinge having a hinge axis that is arranged at an oblique angle relative to a longitudinal centerline of the vehicle.

5. The vehicle seat hinge assembly as set forth in claim 4, wherein said seat support assembly includes a first hinge plate that is mounted to said base plate, a second hinge plate that is mounted to said seat base, and a latch plate that is laterally spaced from said second hinge plate and that is configured to mount to the seat.

6. The vehicle seat hinge assembly as set forth in claim 5, further comprising:

a latch pin fixedly mounted to said base plate.

7. The vehicle seat hinge assembly as set forth in claim 6, wherein said latch plate supports said latch assembly such that said latch assembly can move with said latch plate relative to said base plate and said latch pin, said latch assembly including a latching mechanism that receives and engages said latch pin.

8. The vehicle seat hinge assembly as set forth in claim 7, wherein said base plate includes a front inboard corner, a rear inboard corner, a front outboard corner, and a rear outboard corner and wherein said base plate is configured to be installed in the vehicle such that said front and rear inboard corners of said base plate are positioned closer to said longitudinal centerline of the vehicle than said front and rear outboard corners.

9. The vehicle seat hinge assembly as set forth in claim 8, wherein said off-center hinge is positioned on said front inboard corner of said base plate and said latch pin is positioned on said rear outboard corner of said base plate.

10. The vehicle seat hinge assembly as set forth in claim 7, further comprising:

at least one bumper, made of a resilient material, that is attached to said latch plate such that said bumper contacts said base plate to prevent noise, vibration, harshness when said latching mechanism receives and engages said latch pin.

11. A seat assembly for a vehicle, said seat assembly comprising:

a seat comprising a seat base;

a vehicle seat hinge assembly configured to secure said seat base to the vehicle;

said vehicle seat hinge assembly including a base plate that is configured to mount to a floor of the vehicle or a seat pedestal rigidly mounted to the floor of the vehicle, a seat support assembly configured to mount to a lower surface of the seat base, a latch assembly releasably coupling said seat support assembly to said base plate, and an off-center hinge that pivotally couples said seat support assembly to said base plate;

said base plate having a base plate centerline that is spaced from and parallel to a vehicle centerline, said base plate defining a plane;

said seat support assembly including a first hinge plate mounted to said base plate, a second hinge plate mounted to said seat base, and a latch plate that is laterally spaced from said second hinge plate and that is mounted to said seat base;

said latch assembly attached to and supported by said latch plate; and said off-center hinge pivotally coupling said first and second hinge plates to one another for rotation between a rest position and a tilted position about a hinge axis that is arranged at an oblique angle relative to said base plate centerline, said oblique angle being greater than zero degrees and less than ninety degrees, said hinge axis extending parallel and adjacent to each of said plane of said base plate and said lower surface of the seat base, and wherein in a position of use, the base plate underlies the support assembly and the support assembly underlies the seat base.

12. The seat assembly as set forth in claim 11, wherein said seat includes a seat base and a seat back.

13. The seat assembly as set forth in claim 12, wherein said seat base has an inboard edge, an outboard edge, a front edge, a rear edge, and a seat base centerline, positioned between said inboard and outboard edges, that is aligned with said base plate centerline and runs in a longitudinal direction from said front edge to said rear edge.

14. The seat assembly as set forth in claim 13, wherein said vehicle seat hinge assembly is configured to secure said seat to the vehicle in an orientation where said seat base centerline is spaced from and parallel to said vehicle centerline when said seat is in said rest position such that said inboard edge of said seat base is positioned closer to said vehicle centerline than said outboard edge of said seat base.

15. The seat assembly as set forth in claim 14, wherein said base plate includes a front inboard corner and a rear inboard corner that are aligned with said inboard edge of said seat base and said base plate includes a front outboard corner and a rear outboard corner that are aligned with said outboard edge of said seat base such that said front and rear inboard corners are positioned closer to said vehicle centerline than said front and rear outboard corners when said seat is installed in the vehicle.

16. The seat assembly as set forth in claim 15, wherein said off-center hinge is positioned at said front inboard corner of said base plate and includes a first hinge plate knuckle extending from said first hinge plate, a second hinge plate knuckle extending from said second hinge plate, and a hinge pin received in said first and second hinge plate knuckles that extends co-axially with said hinge axis.

17. The seat assembly as set forth in claim 13, wherein said latch assembly includes a latching mechanism that engages a latch pin fixedly mounted to said base plate and first and second release cables that are configured to release said latching mechanism, said first release cable extending through a seat bight between said seat base and said seat back and said second release cable extending from said rear edge of said seat base.

\* \* \* \* \*